US012798261B2

(12) United States Patent
Araki et al.

(10) Patent No.: US 12,798,261 B2
(45) Date of Patent: Nov. 17, 2026

(54) IMAGE FORMING APPARATUS CAPABLE OF SHORTENING WAIT TIME OF USER BEFORE START OF IMAGE FORMATION, AND OPERATION CONTROL METHOD

(71) Applicant: KYOCERA Document Solutions Inc., Osaka (JP)

(72) Inventors: Takuma Araki, Osaka (JP); Yuna Niimi, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 133 days.

(21) Appl. No.: 18/760,615

(22) Filed: Jul. 1, 2024

(65) Prior Publication Data

US 2025/0010617 A1 Jan. 9, 2025

(30) Foreign Application Priority Data

Jul. 7, 2023 (JP) ................................ 2023-111862

(51) Int. Cl.

| | |
|---|---|
| ***B41J 2/38*** | (2006.01) |
| ***B41J 2/045*** | (2006.01) |
| ***B41J 2/17*** | (2006.01) |
| ***B41J 2/175*** | (2006.01) |
| ***B41J 2/18*** | (2006.01) |

(52) U.S. Cl.

CPC ............ *B41J 2/38* (2013.01); *B41J 2/04563* (2013.01); *B41J 2/1721* (2013.01); *B41J 2/175* (2013.01); *B41J 2/18* (2013.01); *B41J 2202/08* (2013.01)

(58) Field of Classification Search

CPC ........ B41J 2/38; B41J 2/04563; B41J 2/1721; B41J 2/175; B41J 2/18; B41J 2202/08

See application file for complete search history.

(56) References Cited

U.S. PATENT DOCUMENTS

2010/0283808 A1* 11/2010 Terakado .................. B41J 2/18 347/6

FOREIGN PATENT DOCUMENTS

JP 2011140197 A 7/2011

* cited by examiner

*Primary Examiner* — Geoffrey S Mruk

(74) *Attorney, Agent, or Firm* — Alleman Hall LLP

(57) ABSTRACT

An image forming apparatus includes a first ink flow path, a second ink flow path, a heater, and a flow processing portion. The first ink flow path forms a supply path of ink that reaches an ejection portion which ejects the ink. The second ink flow path forms a recovery path of waste ink ejected by the ejection portion. The heater warms the ink at a warming position that is more on an upstream side of a flowing direction of the ink than the ejection portion on the supply path. The flow processing portion causes, when a temperature of the ink in a specific section from the warming position to the ejection portion on the supply path is smaller than a threshold value, the ink warmed by the heater to flow along the supply path and the recovery path until the ink reaches the ejection portion.

4 Claims, 8 Drawing Sheets

IMAGE FORMING APPARATUS CAPABLE OF SHORTENING WAIT TIME OF USER BEFORE START OF IMAGE FORMATION, AND OPERATION CONTROL METHOD

INCORPORATION BY REFERENCE

This application is based upon and claims the benefit of priority from the corresponding Japanese Patent Application No. 2023-111862 filed on Jul. 7, 2023, the entire contents of which are incorporated herein by reference.

BACKGROUND

The present disclosure relates to an image forming apparatus that uses an inkjet system, and an operation control method.

In an image forming apparatus capable of forming an image using an inkjet system, ink used for forming an image is warmed to a temperature suited for image formation before start of the image formation. For example, there is known an image forming apparatus including a heater which warms the ink on a supply path of the ink that reaches a recording head.

SUMMARY

An image forming apparatus according to an aspect of the present disclosure includes an ejection portion, a first ink flow path, a second ink flow path, a heater, an acquisition processing portion, and a flow processing portion. The ejection portion ejects ink. The first ink flow path forms a supply path of the ink that reaches the ejection portion. The second ink flow path forms a recovery path of waste ink ejected by the ejection portion. The heater warms the ink at a warming position that is more on an upstream side of a flowing direction of the ink than the ejection portion on the supply path. The acquisition processing portion acquires a temperature of the ink in a specific section from the warming position to the ejection portion on the supply path. The flow processing portion causes, when the temperature of the ink acquired by the acquisition processing portion is smaller than a predetermined threshold value, the ink warmed by the heater to flow along the supply path and the recovery path until the ink reaches the ejection portion.

An operation control method according to another aspect of the present disclosure is executed in an image forming apparatus including an ejection portion which ejects ink, a first ink flow path which forms a supply path of the ink that reaches the ejection portion, a second ink flow path which forms a recovery path of waste ink ejected by the ejection portion, and a heater which warms the ink at a warming position that is more on an upstream side of a flowing direction of the ink than the ejection portion on the supply path, and includes an acquisition step and a flow step. The acquisition step includes acquiring a temperature of the ink in a specific section from the warming position to the ejection portion on the supply path. The flow step includes causing, when the temperature of the ink acquired in the acquisition step is smaller than a predetermined threshold value, the ink warmed by the heater to flow along the supply path and the recovery path until the ink reaches the ejection portion.

This Summary is provided to introduce a selection of concepts in a simplified form that are further described below in the Detailed Description with reference where appropriate to the accompanying drawings. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Hereinafter, embodiments of the present disclosure will be described with reference to the attached drawings. It is noted that the following embodiments are each an example of embodying the present disclosure and do not limit the technical scope of the present disclosure.

[Configuration of Image Forming Apparatus 100]

Figure 1:
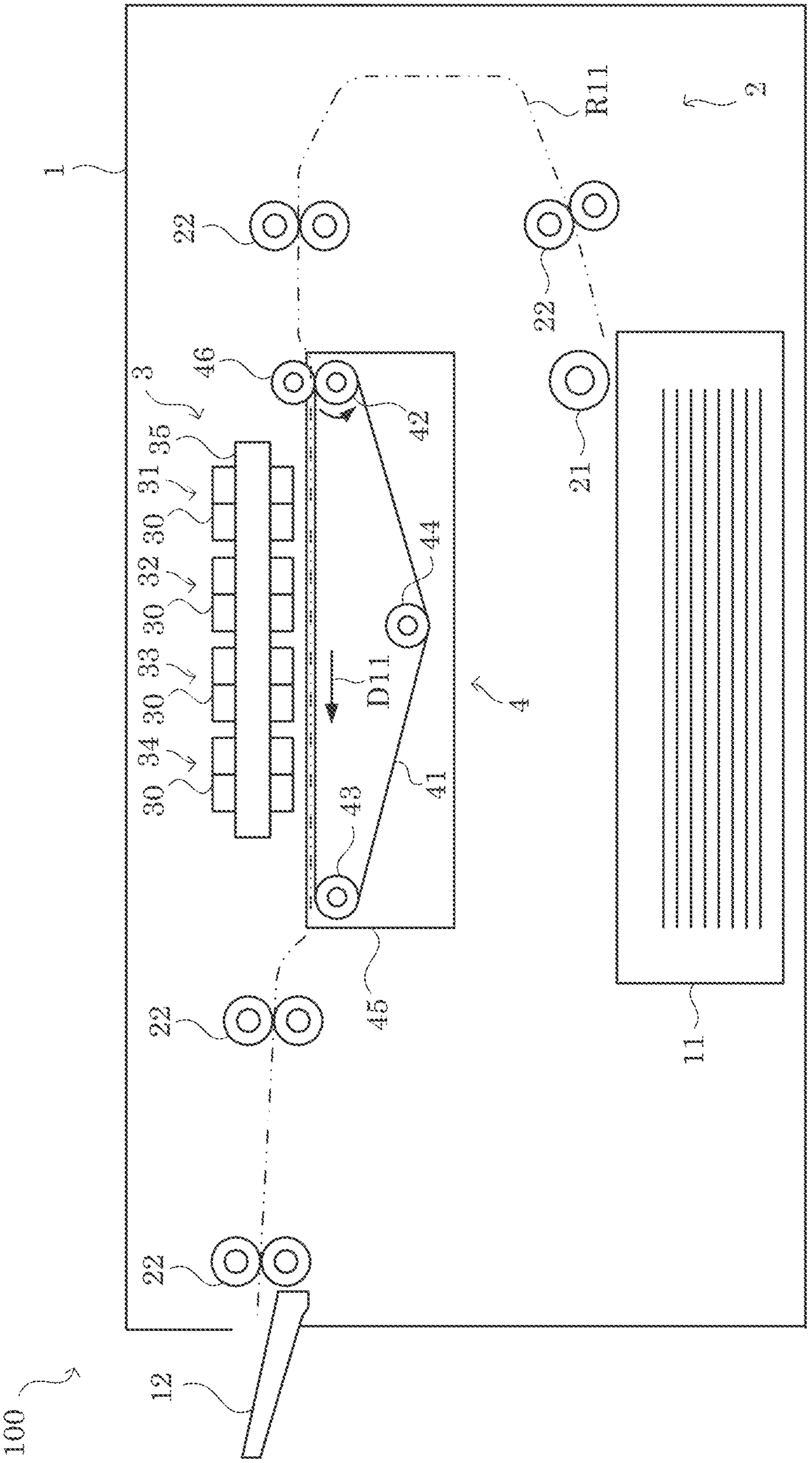
FIG. 1 is a diagram showing a configuration of an image forming apparatus according to an embodiment of the present disclosure.
Figure 2:
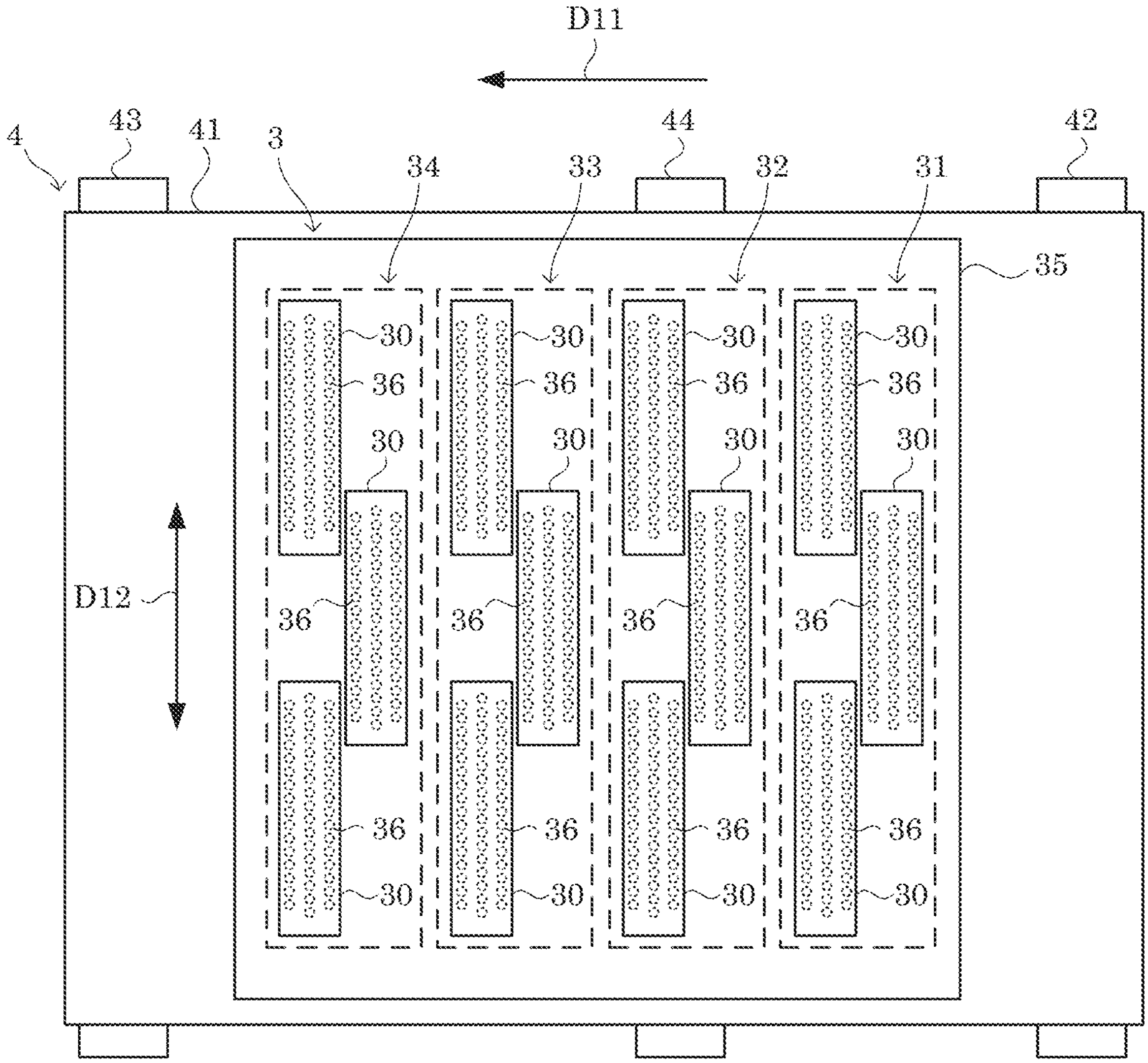
FIG. 2 is a diagram showing configurations of an image forming portion and a conveying unit in the image forming apparatus according to the embodiment of the present disclosure.

First, a configuration of an image forming apparatus 100 according to an embodiment of the present disclosure will be described with reference to FIG. 1 to FIG. 3. Herein, FIG. 1 is a cross-sectional view showing the configuration of the image forming apparatus 100. Further, FIG. 2 is a plan view showing configurations of an image forming portion 3 and a conveying unit 4. It is noted that in FIG. 1, a sheet conveying path R11 is indicated by a dash-dot-dot line.

The image forming apparatus 100 is a printer that is capable of forming an image on a sheet using an inkjet system. It is noted that the present disclosure may also be applied to image forming apparatuses such as a facsimile apparatus, a copying machine, and a multifunction peripheral that are capable of forming an image on a sheet using the inkjet system.

Figure 3:
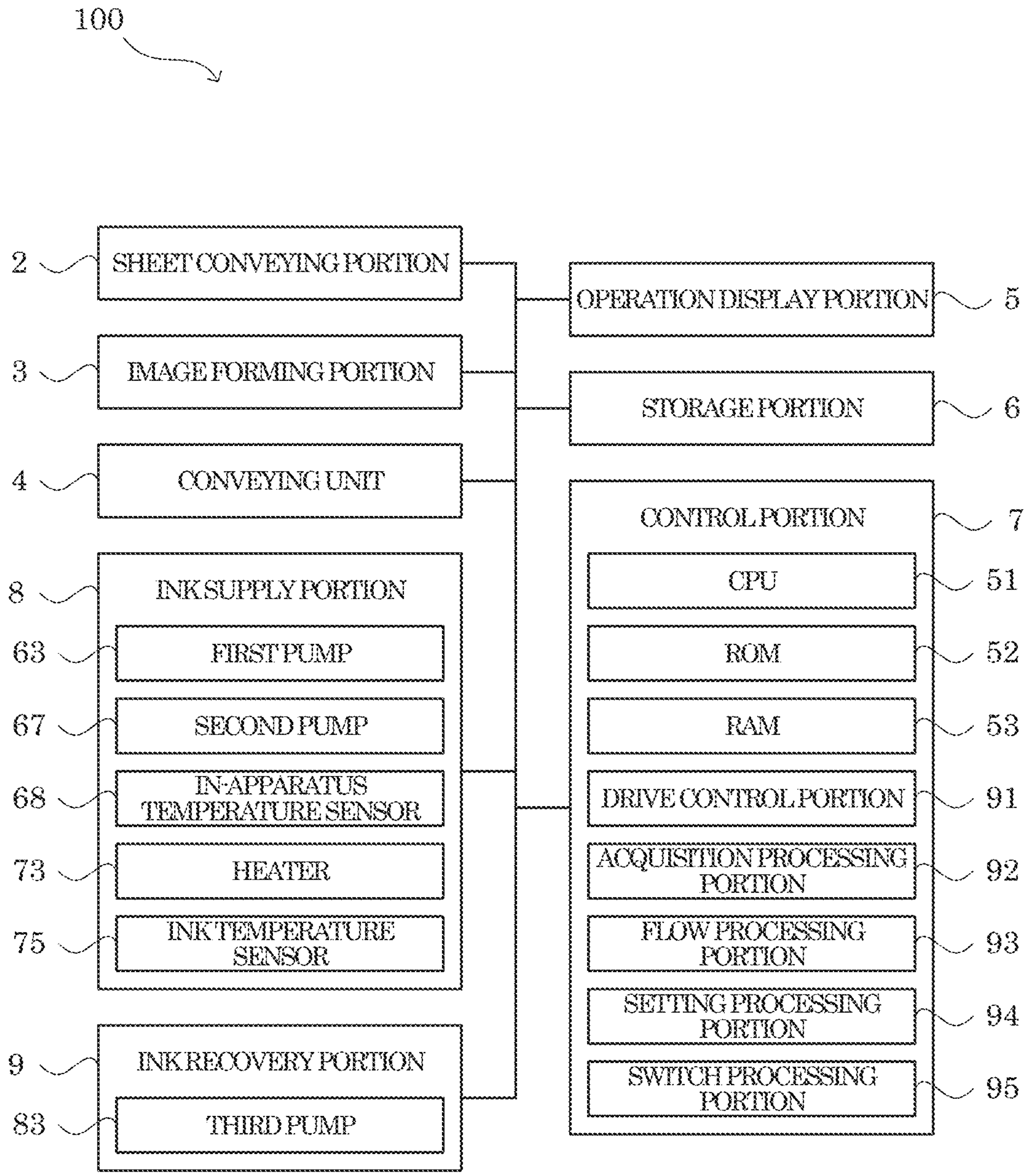
FIG. 3 is a block diagram showing a system configuration of the image forming apparatus according to the embodiment of the present disclosure.

As shown in FIG. 1 and FIG. 3, the image forming apparatus 100 includes a housing 1, a sheet conveying portion 2, the image forming portion 3, the conveying unit 4, an operation display portion 5, a storage portion 6, a control portion 7, an ink supply portion 8, and an ink recovery portion 9.

The housing 1 houses respective constituent elements of the image forming apparatus 100. A sheet feed cassette 11 is detachably provided in the housing 1. Sheets on which images are to be formed are stored in the sheet feed cassette 11. A sheet discharge tray 12 is provided on an outer side surface of the housing 1. A sheet on which an image has been formed by the image forming portion 3 is discharged onto the sheet discharge tray 12. Inside the housing 1, a sheet stored in the sheet feed cassette 11 is conveyed along the sheet conveying path R11 that reaches the sheet discharge tray 12 (see FIG. 1) via an image forming position of the image forming portion 3.

The sheet conveying portion 2 conveys the sheet stored in the sheet feed cassette 11 along the sheet conveying path R11 (see FIG. 1). As shown in FIG. 1, the sheet conveying portion 2 includes a pickup roller 21 and a plurality of conveying rollers 22. The pickup roller 21 picks up an uppermost sheet out of a sheaf of sheets stored in the sheet feed cassette 11 and feeds the sheet to the sheet conveying path R11. The plurality of conveying rollers 22 are provided while being arranged along the sheet conveying path R11. Each of the plurality of conveying rollers 22 conveys the sheet along the sheet conveying path R11. Each of the plurality of conveying rollers 22 conveys the sheet in a conveying direction D11 (see FIG. 1) directed from the sheet feed cassette 11 toward the sheet discharge tray 12.

The image forming portion 3 forms an image that is based on image data on a sheet supplied from the sheet conveying portion 2. As shown in FIG. 1, the image forming portion 3 includes line heads 31 to 34 and a head frame 35.

As shown in FIG. 2, each of the line heads 31 to 34 is elongated in a width direction D12 orthogonal to the conveying direction D11. Specifically, each of the line heads 31 to 34 has, in the width direction D12, a length corresponding to a width of a sheet of a maximum size out of the sheets that can be stored in the sheet feed cassette 11. The line heads 31 to 34 are provided next to one another at regular intervals along the conveying direction D11.

As shown in FIG. 2, each of the line heads 31 to 34 includes a plurality of recording heads 30. The recording head 30 ejects ink toward the sheet conveyed by the conveying unit 4. Specifically, a large number of nozzles 36 (see FIG. 2) used for ejecting the ink are provided on an opposing surface of the recording head 30 that opposes the sheet. Each of the recording heads 30 provided in the line head 31 ejects the ink of black. Each of the recording heads 30 provided in the line head 32 ejects the ink of cyan. Each of the recording heads 30 provided in the line head 33 ejects the ink of magenta. Each of the recording heads 30 provided in the line head 34 ejects the ink of yellow. The recording head 30 is an example of an ejection portion according to the present disclosure.

In the present embodiment, in the line head 31, three recording heads 30 are arranged in a staggered pattern along the width direction D12. In addition, also in each of the other line heads 32 to 34, three recording heads 30 are arranged in a staggered pattern along the width direction D12 similar to the line head 31. It is noted that FIG. 2 shows a state where the image forming portion 3 is seen from the upper side in FIG. 1.

The head frame 35 supports the line heads 31 to 34. The head frame 35 is supported by the housing 1. It is noted that the number of line heads to be provided in the image forming portion 3 only needs to be one or more. In addition, the number of recording heads 30 to be provided in each of the line heads 31 to 34 does not need to be limited to three.

As shown in FIG. 1, the conveying unit 4 is arranged below the line heads 31 to 34. The conveying unit 4 conveys the sheet while the sheet opposes the recording heads 30. For example, the conveying unit 4 conveys the sheet by a predetermined conveying amount every time the ink is ejected by the recording heads 30. In addition, the conveying unit 4 stops conveying the sheet while the ejection of the ink is performed by the recording heads 30. As shown in FIG. 1, the conveying unit 4 includes a conveying belt 41 on which the sheet is to be placed, a first tension roller 42, a second tension roller 43, and a third tension roller 44 across which the conveying belt 41 is stretched, and a conveying frame 45 that supports these members. It is noted that a gap between the conveying belt 41 and the recording heads 30 is adjusted such that a gap between a front surface of a sheet and the recording heads 30 during image formation becomes a predetermined distance (for example, 1 mm).

The first tension roller 42 is rotationally driven by a rotational driving force supplied from a motor (not shown). Thus, the conveying belt 41 rotates in a direction in which the sheet can be conveyed in the conveying direction D11 (see FIG. 1). It is noted that the conveying unit 4 is also provided with a suction unit (not shown) which sucks in air from a plurality of through-holes formed in the conveying belt 41 so as to cause the sheet to stick to the conveying belt 41, or the like. In addition, a pressure roller 46 for conveying the sheet while pressing the sheet against the conveying belt 41 is provided above the first tension roller 42.

The operation display portion 5 is a user interface of the image forming apparatus 100. The operation display portion 5 includes a display portion and an operation portion. The display portion displays various types of information in response to control instructions from the control portion 7. The display portion is, for example, a liquid crystal display. The operation portion is used for inputting various types of information to the control portion 7 according to user operations. The operation portion is, for example, a touch panel. The operation display portion 5 is provided on an upper surface of the housing 1.

The storage portion 6 is a nonvolatile storage device. For example, the storage portion 6 is a nonvolatile memory such as a flash memory. It is noted that the storage portion 6 may alternatively be an SSD (Solid State Drive) or an HDD (Hard Disk Drive).

The control portion 7 collectively controls the image forming apparatus 100. As shown in FIG. 3, the control portion 7 includes a CPU 51, a ROM 52, and a RAM 53. The CPU 51 is a processor which executes various types of calculation processing. The ROM 52 is a nonvolatile storage device in which information such as control programs for causing the CPU 51 to execute various types of processing is stored in advance. The RAM 53 is a volatile or nonvolatile storage device used as a temporary storage memory (working area) for the various types of processing to be executed by the CPU 51. The CPU 51 executes the various control programs stored in advance in the ROM 52 to collectively control the image forming apparatus 100. It is noted that the control portion 7 may be a control portion provided separate from a main control portion which collectively controls the image forming apparatus 100. Further, the control portion 7 may be configured by an electronic circuit such as an integrated circuit (ASIC).

[Configurations of Ink Supply Portion 8 and Ink Recovery Portion 9]

Figure 4:
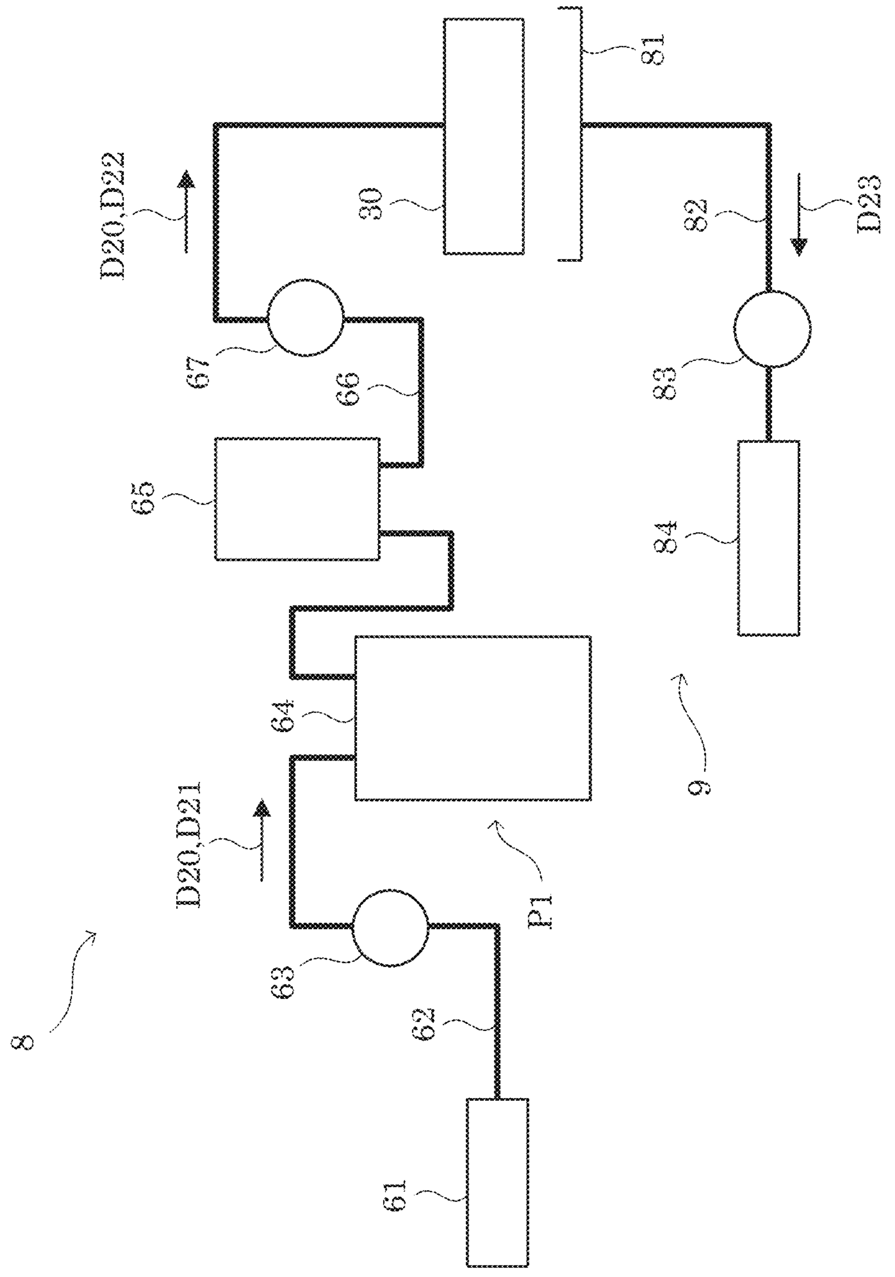
FIG. 4 is a diagram showing configurations of an ink supply portion and an ink recovery portion in the image forming apparatus according to the embodiment of the present disclosure.
Figure 5:
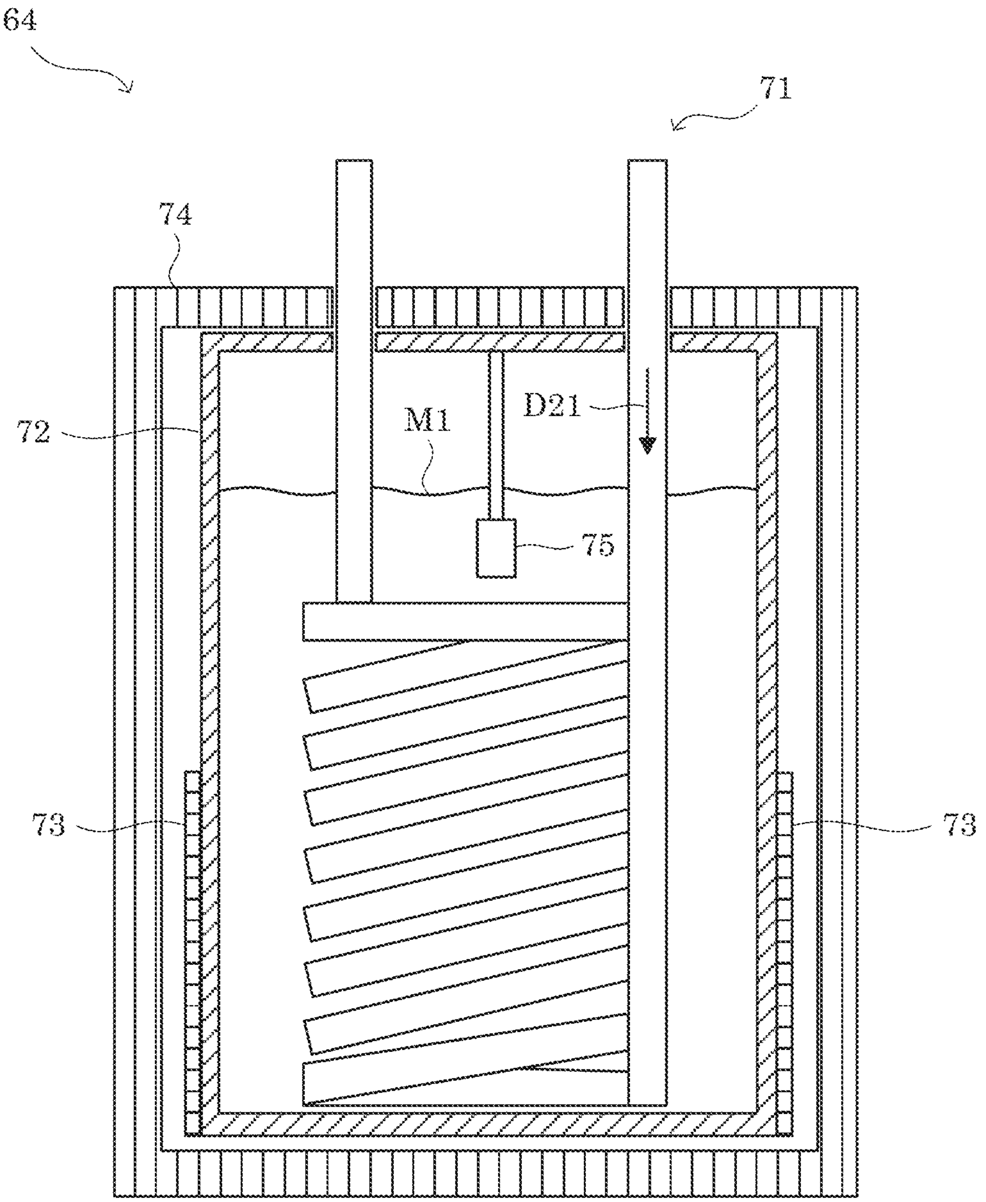
FIG. 5 is a diagram showing a configuration of a warming device of the image forming apparatus according to the embodiment of the present disclosure.

Next, configurations of the ink supply portion 8 and the ink recovery portion 9 will be described with reference to FIG. 3 to FIG. 5. Herein, FIG. 4 is a schematic diagram showing the configurations of the ink supply portion 8 and the ink recovery portion 9. Further, FIG. 5 is a cross-sectional view showing a configuration of a warming device 64. It is noted that in FIG. 4, a first supply flow path 62, a second supply flow path 66, and a recovery flow path 82 are indicated by bold lines.

The ink supply portion 8 supplies the ink to the recording heads 30. The ink supply portion 8 is provided for each of the recording heads 30. It is noted that the configurations of the plurality of ink supply portions 8 corresponding to the line heads 31 to 34 are the same except that the colors of the ink to be supplied differ.

As shown in FIG. 3 and FIG. 4, the ink supply portion 8 includes an ink container 61, the first supply flow path 62, a first pump 63, the warming device 64, a sub ink tank 65, the second supply flow path 66, a second pump 67, and an in-apparatus temperature sensor 68.

The ink container 61 stores the ink. For example, the ink is aqueous ink that contains water as a main solvent. It is noted that the ink may alternatively be non-aqueous ink that contains an organic solvent or the like as the main solvent.

The first supply flow path 62 is an ink flow path provided between the ink container 61 and the sub ink tank 65. The first supply flow path 62 is formed of a material having flexibility. For example, the first supply flow path 62 is a tube formed of a resin.

The first pump 63 forms a part of the first supply flow path 62. The first pump 63 causes the ink in the first supply flow path 62 to flow in a first flowing direction D21 (see FIG. 4) directed toward the recording head 30. The first pump 63 is, for example, a syringe pump.

The warming device 64 forms a part of the first supply flow path 62. The warming device 64 warms the ink that flows through the first supply flow path 62.

As shown in FIG. 5, the warming device 64 includes a corrugated tube 71, a container 72, a heater 73, a heat insulation material 74, and an ink temperature sensor 75.

The corrugated tube 71 is a tube that is formed spirally. The corrugated tube 71 is arranged in an attitude in which a helical axis is provided along a vertical direction. For example, the corrugated tube 71 is formed by processing a straight pipe formed of metal into a spiral form. The corrugated tube 71 forms a part of the first supply flow path 62.

The container 72 stores the corrugated tube 71 and a liquid heating medium M1 (see FIG. 5) used for warming the corrugated tube 71. For example, the container 72 includes a cylindrical portion extending along the vertical direction, a disk-shape bottom portion that blocks a lower end portion of the cylindrical portion, and a disk-shape top plate portion that blocks an upper end portion of the cylindrical portion.

The inside of the container 72 is filled with the heating medium M1 (see FIG. 5) in an amount with which a spirally-formed spiral portion included in the corrugated tube 71 disappears in water. The heating medium M1 is, for example, water. It is noted that the heating medium M1 is not limited to water and may be fluid such as oil.

The heater 73 heats the container 72. Specifically, the heater 73 is a so-called sheet heater. For example, the heater 73 includes a heating wire and a metal sheet such as aluminum that covers the heating wire. The heater 73 is provided to cover an outer surface of the container 72. In the warming device 64, by heating the container 72 by the heater 73, the heating medium M1 stored in the container 72 is heated. Thus, the ink that flows inside the spiral portion arranged in the heating medium M1 is warmed to the same temperature as the heating medium M1.

The heat insulation material 74 is provided to cover an outer circumferential surface of the container 72. The heater 73 is provided between the container 72 and the heat insulation material 74. For example, the heat insulation material 74 is provided so as to cover an entire outer surface of the container 72.

The ink temperature sensor 75 is used to detect a temperature of the ink warmed by the warming device 64. For example, the ink temperature sensor 75 is a contact-type temperature sensor provided in contact with the heating medium M1. The ink temperature sensor 75 outputs a first detection signal including a signal value corresponding to the temperature of the heating medium M1 in contact therewith. The first detection signal output from the ink temperature sensor 75 is input to the control portion 7.

It is noted that the warming device 64 may have a configuration in which the ink is warmed without using the heating medium M1.

The sub ink tank 65 accumulates the ink supplied from the ink container 61. The ink accumulated in the sub ink tank 65 is supplied to the recording head 30.

The second supply flow path 66 is an ink flow path provided between the sub ink tank 65 and the recording head 30. The second supply flow path 66 is formed of a material having flexibility. For example, the second supply flow path 66 is a tube formed of a resin.

The second pump 67 forms a part of the second supply flow path 66. The second pump 67 causes the ink in the second supply flow path 66 to flow in a second flowing direction D22 (see FIG. 4). The second pump 67 is, for example, a syringe pump.

The in-apparatus temperature sensor 68 detects a temperature inside the housing of the image forming apparatus 100 (in-apparatus temperature). The in-apparatus temperature sensor 68 is provided inside the housing of the image forming apparatus 100. The in-apparatus temperature sensor 68 outputs a second detection signal including a signal value corresponding to the temperature inside the housing. The second detection signal output from the in-apparatus temperature sensor 68 is input to the control portion 7.

The first supply flow path 62 and the second supply flow path 66 form a supply path of the ink that reaches the recording head 30. The heater 73 of the warming device 64 warms the ink at a warming position P1 (see FIG. 4) that is more on an upstream side of a supplying direction D20 of the ink (see FIG. 4) than the recording head 30 on the supply path. The sub ink tank 65 is provided in a specific section from the warming position P1 to the recording head 30 on the supply path. The first pump 63 is provided more on the upstream side of the supplying direction D20 than the sub ink tank 65 on the supply path, and supplies the ink warmed by the heater 73 to the sub ink tank 65. The second pump 67 is provided more on a downstream side of the supplying direction D20 than the sub ink tank 65 on the supply path, and sucks the same amount of ink as the ink supply amount supplied by the first pump 63 from the sub ink tank 65 and supplies the ink to the recording head 30. The first supply flow path 62 and the second supply flow path 66 are an example of a first ink flow path according to the present disclosure. In addition, the supplying direction D20 is an example of a flowing direction according to the present disclosure. Moreover, the sub ink tank 65 is an example of an accumulation portion according to the present disclosure.

The ink recovery portion 9 recovers the ink (waste ink) ejected by the recording head 30. For example, the ink recovery portion 9 is provided for each of the recording heads 30. It is noted that the configurations of the plurality of ink recovery portions 9 corresponding to the line heads 31 to 34 are the same except that the colors of the ink to be recovered differ. It is noted that the ink recovery portion 9 may be provided in correspondence with the plurality of recording heads 30.

As shown in FIG. 3 and FIG. 4, the ink recovery portion 9 includes an ink reception portion 81, a recovery flow path 82, a third pump 83, and a waste ink storing portion 84.

The ink reception portion 81 receives the waste ink ejected by the recording head 30. The ink reception portion 81 is provided to be movable between an opposing position that opposes the recording head 30 at a position below the recording head 30 and an evacuation position evacuated from the opposing position in a horizontal direction. The ink reception portion 81 is moved to the evacuation position when forming an image on a sheet.

The recovery flow path 82 is an ink flow path provided between the ink reception portion 81 and the waste ink storing portion 84. The recovery flow path 82 is formed of a material having flexibility. For example, the recovery flow path 82 is a tube formed of a resin.

The third pump 83 forms a part of the recovery flow path 82. The third pump 83 causes the waste ink in the recovery flow path 82 to flow in a third flowing direction D23 (see FIG. 4). The third pump 83 is, for example, a syringe pump.

The waste ink storing portion 84 stores the waste ink ejected by the recording head 30.

The recovery flow path 82 forms a recovery path of the waste ink ejected by the recording head 30. The recovery flow path 82 is an example of a second ink flow path according to the present disclosure.

In the image forming apparatus 100, before start of image formation, the ink is warmed to a temperature suited for the image formation by the heater 73 of the warming device 64.

Incidentally, in a conventional image forming apparatus, when the ink in the specific section from the warming position P1 (see FIG. 4) to the recording head 30 on the supply path is cooled, it takes time to warm the ink. Therefore, in the conventional image forming apparatus, when the ink in the specific section is cooled, a wait time of a user before start of the image formation becomes long.

In contrast, in the image forming apparatus 100 according to the embodiment of the present disclosure, the wait time of the user before the start of the image formation can be shortened as will be described below.

[Configuration of Control Portion 7]

Next, a configuration of the control portion 7 will be described in more detail with reference to FIG. 3.

As shown in FIG. 3, the control portion 7 includes a drive control portion 91, an acquisition processing portion 92, a flow processing portion 93, a setting processing portion 94, and a switch processing portion 95.

Specifically, an operation control program for causing the CPU 51 to function as the respective functional portions described above is stored in advance in the ROM 52 of the control portion 7. Then, the CPU 51 executes the operation control program stored in the ROM 52 to function as the respective functional portions described above.

It is noted that the operation control program may be recorded onto a computer-readable recording medium such as a CD, a DVD, and a flash memory so as to be read from the recording medium and stored in a storage device such as the storage portion 6. Alternatively, a part or all of the respective functional portions described above may be configured by an electronic circuit such as an integrated circuit (ASIC). Alternatively, the operation control program may be a program for causing a plurality of processors to function as the respective functional portions included in the control portion 7.

The drive control portion 91 controls drive of the heater 73 based on a difference between the temperature of the ink at the warming position P1 (see FIG. 4) and a preset target temperature.

Specifically, the drive control portion 91 controls power to be supplied to the heater 73 such that a first detection temperature detected by the ink temperature sensor 75 becomes the target temperature. For example, the drive control portion 91 controls the drive of the heater 73 by PID control. For example, in the image forming apparatus 100, a switching device (not shown) that is capable of making a switch between conduction and cutoff of a power feeding path between a power supply (not shown) and the heater 73 is provided on the power feeding path. The drive control portion 91 inputs a PWM signal of a duty ratio corresponding to a difference between the first detection temperature and the target temperature to the switching device, to thus control on/off of the switching device. Thus, a power feeding amount to the heater 73 is adjusted in accordance with the difference between the first detection temperature and the target temperature.

The acquisition processing portion 92 acquires the temperature of the ink in the specific section.

For example, when the image forming apparatus 100 shifts from a power-saving state where power consumption is smaller than that of a normal state to the normal state, the acquisition processing portion 92 acquires the temperature of the ink in the specific section based on an elapsed time since the previous shift to the power-saving state and a temperature at an installation position of the image forming apparatus 100.

Herein, the power-saving state is a state where power feed to the image forming portion 3 is stopped and is also a state where the image forming apparatus 100 cannot form an image. In addition, the normal state is a state where power is fed to the image forming portion 3 and is also a state where the image forming apparatus 100 can form an image. For example, in a case where the image forming apparatus 100 is in the normal state, when a user operation that instructs to shift to the power-saving state is accepted or a predetermined time has elapsed since the last time the user operation has been accepted, the control portion 7 shifts the image forming apparatus 100 to the power-saving state. Further, when a user operation is accepted in a case where the image forming apparatus 100 is in the power-saving state, the control portion 7 shifts the image forming apparatus 100 to the normal state. The power-saving state is an example of a first state according to the present disclosure. Moreover, the normal state is an example of a second state. It is noted that the first state according to the present disclosure may include a state where a power supply of the image forming apparatus 100 is turned off.

For example, when the image forming apparatus 100 shifts from the normal state to the power-saving state, the acquisition processing portion 92 records a current time. In addition, when the image forming apparatus 100 shifts from the power-saving state to the normal state, the acquisition processing portion 92 acquires, based on a lastly-recorded time at which the image forming apparatus 100 has been shifted to the power-saving state and the current time, an elapsed time since the previous shift to the power-saving state, that is, the duration of the power-saving state.

Further, the acquisition processing portion 92 acquires a second detection temperature detected by the in-apparatus temperature sensor 68 as the temperature at the installation position of the image forming apparatus 100. It is noted that the acquisition processing portion 92 may acquire the temperature at the installation position of the image forming apparatus 100 using a temperature sensor provided outside the housing of the image forming apparatus 100.

Then, the acquisition processing portion 92 acquires the current temperature of the ink in the specific section based on the acquired elapsed time since the previous shift to the power-saving state, the acquired temperature at the installation position of the image forming apparatus 100, and the temperature of the ink at the time of the previous shift to the power-saving state. Herein, in the image forming apparatus 100, when the image forming apparatus 100 is in the normal state, the temperature of the ink is maintained at a predetermined print-optimum temperature. In other words, the temperature of the ink at the time of the previous shift to the power-saving state is the print-optimum temperature. It is noted that the print-optimum temperature is a predetermined temperature set within a printable temperature range. The printable temperature range is a temperature range of the ink where an image having an image quality exceeding a predetermined reference level can be formed. The printable temperature range and the print-optimum temperature are determined in advance based on a type of the ink.

For example, the acquisition processing portion 92 substitutes the acquired elapsed time since the previous shift to the power-saving state, the acquired temperature at the installation position of the image forming apparatus 100, and the print-optimum temperature into a predetermined first calculation expression, to thus calculate the current temperature of the ink in the specific section. It is noted that when the acquired elapsed time since the previous shift to the power-saving state exceeds a predetermined time, the acquisition processing portion 92 may determine that the current temperature of the ink in the specific section is the same as the acquired temperature at the installation position of the image forming apparatus 100.

It is noted that the image forming apparatus 100 may include a temperature sensor that is capable of detecting the temperature of the ink in the specific section. In this case, the acquisition processing portion 92 only needs to acquire the temperature of the ink in the specific section using the temperature sensor. Alternatively, the acquisition processing portion 92 may acquire the first detection temperature detected by the ink temperature sensor 75 before the drive of the heater 73 as the temperature of the ink in the specific section.

When the temperature of the ink acquired by the acquisition processing portion 92 is smaller than a predetermined threshold value, the flow processing portion 93 causes, until the ink warmed by the heater 73 reaches the recording head 30, the ink to flow along the supply path and the recovery path.

For example, the threshold value is the same value as a lower limit value of the printable temperature range. In other words, the flow processing portion 93 causes the ink to flow when the image forming apparatus 100 cannot form an image having an image quality exceeding the reference level.

Specifically, the flow processing portion 93 uses the first pump 63, the second pump 67, and the third pump 83 to cause the ink to flow along the supply path and the recovery path. It is noted that when causing the ink to flow, the flow processing portion 93 causes the ink reception portion 81 to move to the opposing position.

Herein, after the ink is sucked from the sub ink tank 65 using the second pump 67, the flow processing portion 93 supplies the ink warmed by the heater 73 to the sub ink tank 65 using the first pump 63. Thus, the ink warmed by the heater 73 is supplied to the sub ink tank 65 after an amount of the cooled ink stored in the sub ink tank 65 is reduced. Therefore, the temperature of the ink in the sub ink tank 65 can be raised effectively.

For example, when the number of times the first pump 63 and the second pump 67 are driven reaches a predetermined specific number of times, the flow processing portion 93 determines that the ink warmed by the heater 73 has reached the recording head 30. The specific number of times is determined based on a flow amount of the ink by the first pump 63 and the second pump 67, a storage amount of the ink in a section from the warming position P1 to the sub ink tank 65 out of the first supply flow path 62, a storage amount of the ink by the second supply flow path 66, and the like.

The setting processing portion 94 sets the target temperature based on the temperature of the ink acquired by the acquisition processing portion 92.

For example, when the temperature of the ink acquired by the acquisition processing portion 92 is equal to or larger than the threshold value, the setting processing portion 94 sets the print-optimum temperature as the target temperature.

Further, when the temperature of the ink acquired by the acquisition processing portion 92 is smaller than the threshold value, the setting processing portion 94 sets the target temperature such that the temperature of the ink in the sub ink tank 65 becomes the print-optimum temperature (an example of a specific value according to the present disclosure) by the supply of the warmed ink by the drive of the first pump 63.

For example, the temperature of the warmed ink (hereinafter, will be referred to as a "specific temperature") with which the temperature of the ink in the sub ink tank 65 becomes the print-optimum temperature by the supply of the warmed ink by the drive of the first pump 63 can be calculated based on the following first value, second value, third value, and fourth value. The first value is a value indicating an accumulation amount of the ink in the sub ink tank 65 obtained after the sucking of the ink from the sub ink tank 65 by the second pump 67 and before the supply of the ink to the sub ink tank 65 by the first pump 63. The second value is a value indicating a supply amount of the ink to the sub ink tank 65 by the first pump 63. The third value is a value indicating an amount of the ink present in the section from the warming position P1 to the sub ink tank 65 out of the first supply flow path 62. The fourth value is a value indicating the temperature of the ink acquired by the acquisition processing portion 92.

In other words, out of the ink supplied to the sub ink tank 65 by the first pump 63, the amount of the ink warmed by the heater 73 is an amount obtained by subtracting the amount of the ink present in the section from the warming position P1 to the sub ink tank 65 out of the first supply flow path 62 (the third value) from the supply amount of the ink to the sub ink tank 65 by the first pump 63 (the second value). In addition, in the sub ink tank 65, the amount of the cooled ink that mixes with the warmed ink supplied to the sub ink tank 65 by the first pump 63 is an amount obtained by adding the amount of the ink present in the section from the warming position P1 to the sub ink tank 65 out of the first supply flow path 62 (the third value) to the accumulation amount of the ink in the sub ink tank 65 obtained after the sucking of the ink from the sub ink tank 65 by the second pump 67 and before the supply of the ink to the sub ink tank 65 by the first pump 63 (the first value). In addition, the temperature of the cooled ink is acquired by the acquisition processing portion 92. This temperature of the warmed ink (the specific temperature) with which the temperature of the ink in the sub ink tank 65 can be set to the print-optimum temperature by the mixing of the cooled ink and the warmed ink can be calculated.

For example, the setting processing portion 94 uses a water level sensor (not shown) that is capable of detecting a water level of the ink stored in the sub ink tank 65 to acquire the accumulation amount of the ink in the sub ink tank 65 obtained before the flow of the ink by the flow processing portion 93. Moreover, the setting processing portion 94 subtracts the known sucking amount of the ink from the sub ink tank 65 by the second pump 67 (the second value) from the acquired accumulation amount of the ink, to thus acquire the accumulation amount of the ink in the sub ink tank 65 obtained after the sucking of the ink from the sub ink tank 65 by the second pump 67 and before the supply of the ink to the sub ink tank 65 by the first pump 63 (the first value). In addition, the setting processing portion 94 substitutes the temperature of the ink acquired by the acquisition processing portion 92 (the fourth value), the acquired accumulation amount of the ink (the first value), and the known second value and third value into a predetermined second calculation expression, to thus calculate the specific temperature.

Herein, when the calculated specific temperature exceeds a predetermined upper limit temperature, the setting processing portion 94 sets the upper limit temperature as the target temperature in place of the specific temperature. The upper limit temperature is a temperature that is determined based on the type of the ink. Thus, deterioration of the ink due to an excessive temperature rise can be avoided.

It is noted that table data indicating a correspondence relationship between the temperature of the ink acquired by the acquisition processing portion 92 and a temperature value used for setting the target temperature may be stored in advance in the storage portion 6. In the table data, the correspondence relationship between the temperature of the ink acquired by the acquisition processing portion 92 and the temperature value only needs to be determined such that the temperature value increases as the temperature of the ink acquired by the acquisition processing portion 92 decreases. In this case, when the temperature of the ink acquired by the acquisition processing portion 92 is smaller than the threshold value, the setting processing portion 94 only needs to set the temperature value associated with the temperature of the ink in the table data as the target temperature.

Alternatively, the target temperature may constantly be the print-optimum temperature. In this case, the control portion 7 does not need to include the setting processing portion 94.

The switch processing portion 95 switches the ink flowing function by the flow processing portion 93 between effective and ineffective according to a user operation.

For example, the switch processing portion 95 causes the operation display portion 5 to display a function setting screen used for switching the ink flowing function between effective and ineffective according to a predetermined operation made to the operation display portion 5. Then, the switch processing portion 95 switches the ink flowing function between effective and ineffective according to the user operation made in the function setting screen. Thus, the user can select which of suppressing consumption of the ink and shortening the wait time before start of the image formation is to be prioritized.

Herein, in the case where the temperature of the ink acquired by the acquisition processing portion 92 is smaller than the threshold value, the flow processing portion 93 causes the ink to flow when the ink flowing function is effective and does not cause the ink to flow when the ink flowing function is ineffective.

[Operation Control Processing]

Figure 6:
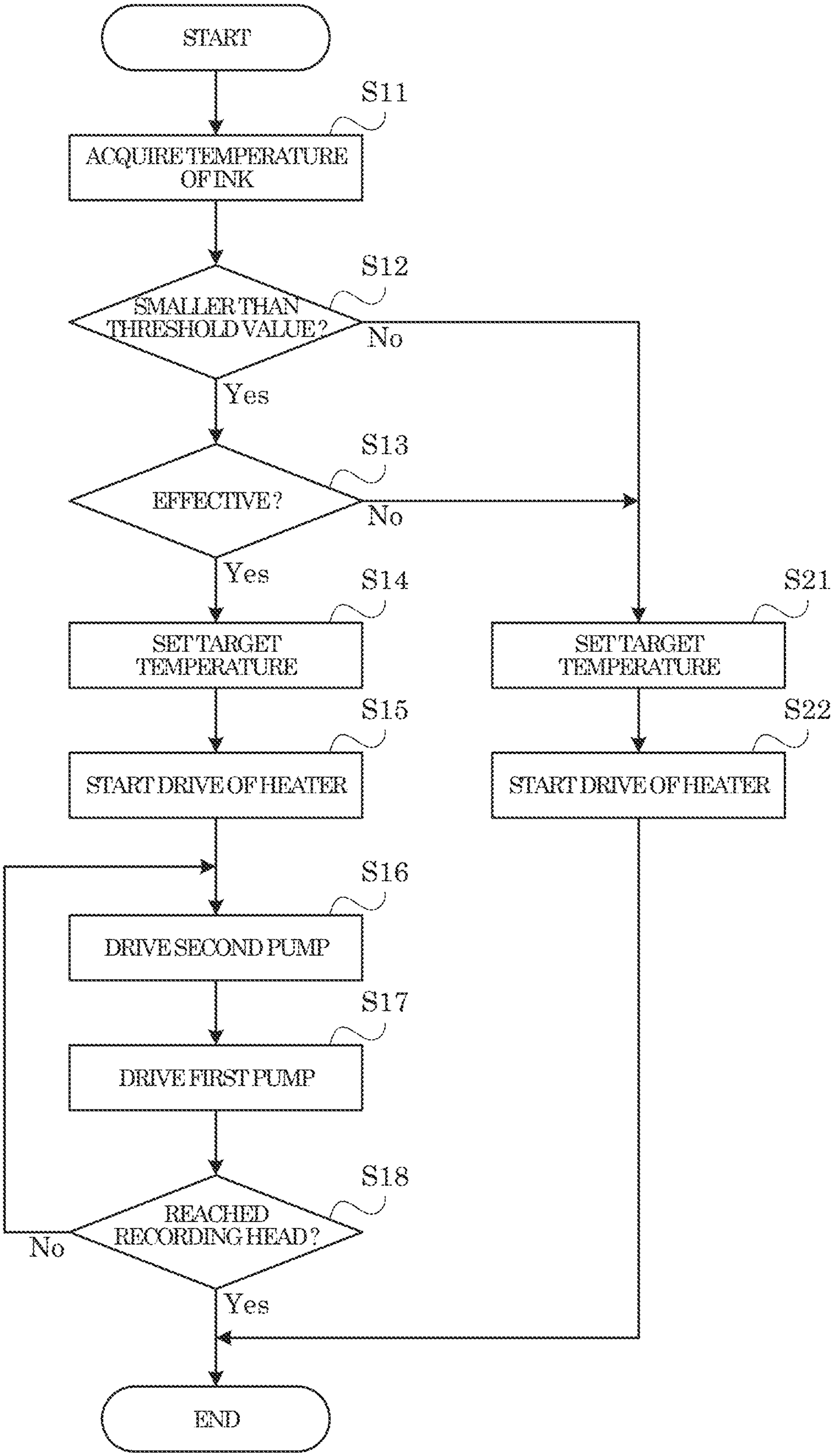
FIG. 6 is a flowchart showing an example of operation control processing executed in the image forming apparatus according to the embodiment of the present disclosure.

Hereinafter, with reference to FIG. 6, an operation control method according to the present disclosure will be described along with exemplary procedures of operation control processing executed by the control portion 7 in the image forming apparatus 100. Herein, Step S11, Step S12, . . . represent numbers of processing procedures (steps) executed by the control portion 7. It is noted that the operation control processing is executed when the image forming apparatus 100 shifts from the power-saving state to the normal state.

<Step S11>

First, in Step S11, the control portion 7 acquires the temperature of the ink in the specific section. Herein, the processing of Step S11 is an example of an acquisition step according to the present disclosure and is executed by the acquisition processing portion 92 of the control portion 7.

Specifically, the control portion 7 acquires, based on a lastly-recorded time at which the image forming apparatus 100 has been shifted to the power-saving state and the current time, an elapsed time since the previous shift to the power-saving state. In addition, the control portion 7 acquires the second detection temperature detected by the in-apparatus temperature sensor 68 as the temperature at the installation position of the image forming apparatus 100. Then, the control portion 7 substitutes the acquired elapsed time since the previous shift to the power-saving state, the acquired temperature at the installation position of the image forming apparatus 100, and the print-optimum temperature into the first calculation expression, to thus calculate the current temperature of the ink in the specific section.

<Step S12>

In Step S12, the control portion 7 determines whether or not the temperature of the ink acquired by the processing of Step S11 is smaller than the threshold value.

Herein, when determining that the temperature of the ink is smaller than the threshold value threshold value (Yes in S12), the control portion 7 shifts the processing to Step S13. On the other hand, when the temperature of the ink is not smaller than the threshold value (No in S12), the control portion 7 shifts the processing to Step S21.

<Step S13>

In Step S13, the control portion 7 determines whether or not the ink flowing function is effective.

Herein, when determining that the ink flowing function is effective (Yes in S13), the control portion 7 shifts the processing to Step S14. On the other hand, when the ink flowing function is not effective (No in S13), the control portion 7 shifts the processing to Step S21.

<Step S14>

In Step S14, the control portion 7 sets the specific temperature or the upper limit temperature as the target temperature. Herein, the processing of Step S14 is an example of a setting step according to the present disclosure and is executed by the setting processing portion 94 of the control portion 7.

Specifically, the control portion 7 uses the water level sensor to acquire the current accumulation amount of the ink in the sub ink tank 65. In addition, the control portion 7 subtracts the known sucking amount of the ink from the sub ink tank 65 by the second pump 67 (the second value) from the acquired accumulation amount of the ink, to thus acquire the accumulation amount of the ink in the sub ink tank 65 obtained after the sucking of the ink from the sub ink tank 65 by the second pump 67 and before the supply of the ink to the sub ink tank 65 by the first pump 63 (the first value). In addition, the control portion 7 substitutes the temperature of the ink acquired by the processing of Step S11 (the fourth value), the acquired accumulation amount of the ink (the first value), and the known second value and third value into the second calculation expression, to thus calculate the specific temperature. Then, the control portion 7 sets the specific temperature as the target temperature when the calculated specific temperature is equal to or smaller than the upper limit temperature, and sets the upper limit temperature as the target temperature when the calculated specific temperature exceeds the upper limit temperature.

<Step S15>

In Step S15, the control portion 7 starts drive control of the heater 73 that is based on a difference between the temperature of the ink at the warming position P1 and the target temperature set by the processing of Step S14. Herein, the processing of Step S15 is executed by the drive control portion 91 of the control portion 7.

Specifically, the control portion 7 controls power to be supplied to the heater 73 such that the first detection temperature detected by the ink temperature sensor 75 becomes the target temperature.

<Step S16>

In Step S16, the control portion 7 drives the second pump 67. Specifically, the control portion 7 drives the second pump 67 once. Thus, the ink in the amount of the second value is sucked from the sub ink tank 65, and the sucked ink is supplied to the recording head 30 side. It is noted that in Step S16, the control portion 7 may drive the second pump 67 a plurality of times.

It is noted that when the ink is ejected from the recording head 30 to the ink reception portion 81 by the drive of the second pump 67, the control portion 7 uses the third pump 83 to cause the ink ejected to the ink reception portion 81 to flow along the recovery path.

<Step S17>

In Step S17, the control portion 7 drives the first pump 63. Specifically, the control portion 7 drives the first pump 63 once. Thus, the ink is sucked from the ink container 61 side, and the ink in the amount of the second value, that includes the ink warmed by the heater 73, is supplied to the sub ink tank 65. It is noted that in Step S17, the control portion 7 may drive the first pump 63 a plurality of times.

Herein, in the operation control processing, the processing of Step S17 is executed after the processing of Step S16. Thus, the ink warmed by the heater 73 can be supplied to the sub ink tank 65 after the accumulation amount of the cooled ink in the sub ink tank 65 is reduced. Consequently, the temperature of the ink in the sub ink tank 65 can be raised effectively.

In addition, in the operation control processing, the ink warmed by the heater 73 to the specific temperature or the upper limit temperature is supplied to the sub ink tank 65. When the ink warmed to the specific temperature is supplied, the temperature of the ink in the sub ink tank 65 can be adjusted to the print-optimum temperature. When the ink warmed to the upper limit temperature is supplied, it is possible to avoid deterioration of the ink due to excessive warming as well as set the temperature of the ink in the sub ink tank 65 to come close to the print-optimum temperature as much as possible.

It is noted that the control portion 7 may change the target temperature to the print-optimum temperature after the first execution of the processing of Step S17. Thus, by the second execution of the processing of Step S17, a situation where the temperature of the ink in the sub ink tank 65 rises while exceeding the printable temperature can be avoided.

<Step S18>

In Step S18, the control portion 7 determines whether or not the warmed ink has reached the recording head 30. Herein, the processing of Step S16, Step S17, and Step S18 is an example of a flow step according to the present disclosure and is executed by the flow processing portion 93 of the control portion 7.

Specifically, when the number of times the processing of Step S16 and Step S17 is executed reaches the specific number of times, the control portion 7 determines that the warmed ink has reached the recording head 30.

Herein, when determining that the warmed ink has reached the recording head 30 (Yes in S18), the control portion 7 ends the operation control processing. On the other hand, when the warmed ink has not reached the recording head 30 (No in S18), the control portion 7 shifts the processing to Step S16. Thus, the second pump 67 and the first pump 63 are driven until the warmed ink reaches the recording head 30.

<Step S21>

In Step S21, the control portion 7 sets the print-optimum temperature as the target temperature. Herein, the processing of Step S21 is an example of the setting step according to the present disclosure and is executed by the setting processing portion 94 of the control portion 7.

<Step S22>

In Step S22, the control portion 7 starts the drive control of the heater 73 that is based on a difference between the temperature of the ink at the warming position P1 and the target temperature set by the processing of Step S21. Herein, the processing of Step S22 is executed by the drive control portion 91 of the control portion 7.

In this manner, in the image forming apparatus 100, when the temperature of the ink acquired by the acquisition processing portion 92 is smaller than the threshold value, the ink warmed by the heater 73 is caused to flow along the supply path and the recovery path until the ink reaches the recording head 30. Thus, the cooled ink present in the specific section can be replaced with the ink warmed by the heater 73. Accordingly, the wait time of the user before the start of the image formation can be shortened.

Other Embodiments

Figure 7:
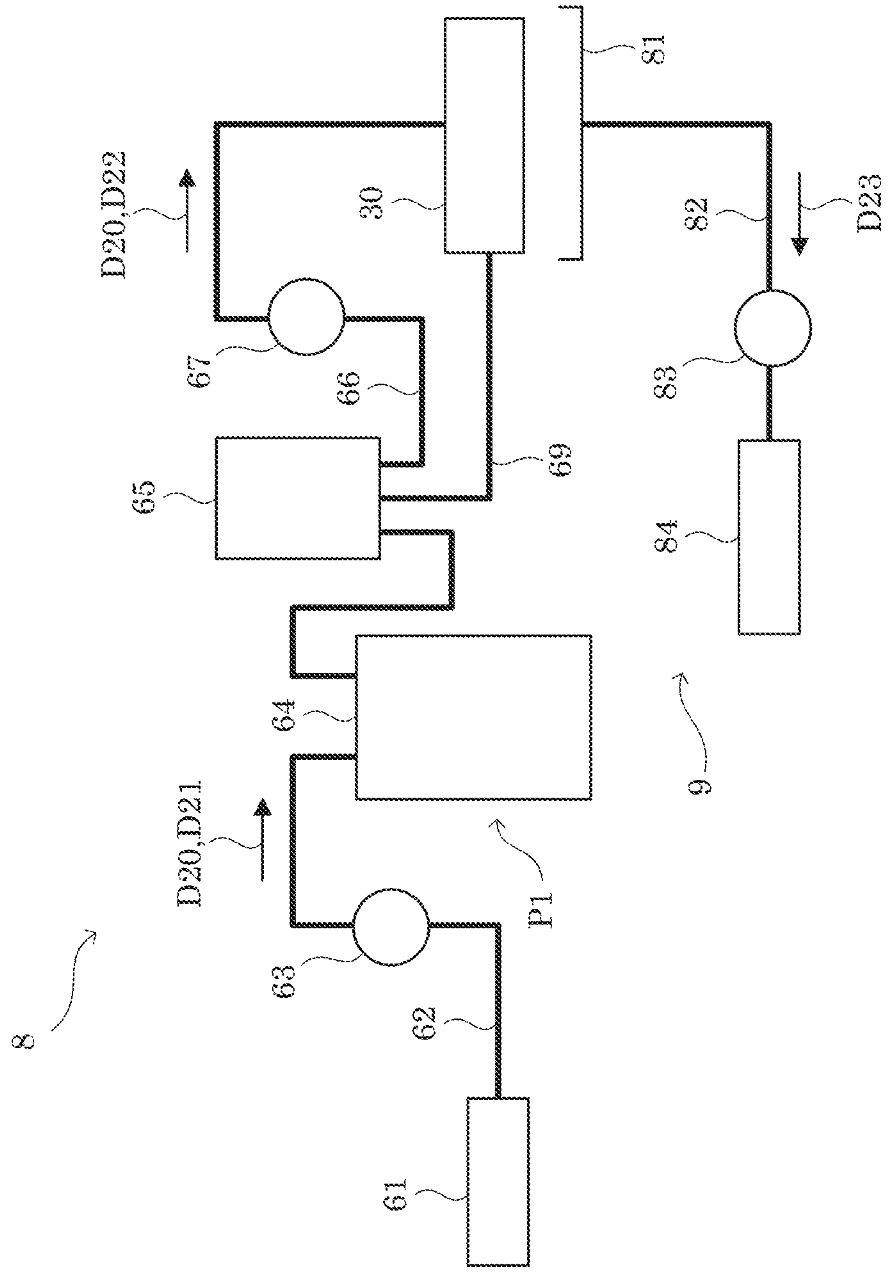
FIG. 7 is a diagram showing configurations of an ink supply portion and an ink recovery portion in an image forming apparatus according to another embodiment of the present disclosure.

It is noted that the image forming apparatus 100 may also include a circulation flow path 69 shown in FIG. 7.

The circulation flow path 69 is an ink flow path provided between the recording head 30 and the sub ink tank 65. The circulation flow path 69 forms a circulation path of the ink that passes through the recording head 30 and the sub ink tank 65 together with the second supply flow path 66. The circulation flow path 69 is an example of a third ink flow path according to the present disclosure.

When the image forming apparatus 100 includes the circulation flow path 69, the flow processing portion 93 may execute first flow processing and second flow processing. The first flow processing is processing of causing the ink to flow along the supply path and the recovery path. The second flow processing is processing of causing the ink to flow along the circulation path. The first flow processing is executed by using the first pump 63, the second pump 67, the third pump 83, and an on-off valve that is capable of making a switch between permitted and prohibited regarding the flow of the ink in the circulation flow path 69. Specifically, in the first flow processing, the second pump 67 is driven in a state where the flow of the ink in the circulation flow path 69 is prohibited by the on-off valve. Further, the second flow processing is executed by using the second pump 67 and the on-off valve. Specifically, in the second flow processing, the second pump 67 is driven in a state where the flow of the ink in the circulation flow path 69 is permitted by the on-off valve.

Moreover, the flow processing portion 93 only needs to execute the second flow processing after the ink warmed by the heater 73 reaches the sub ink tank 65 by the execution of the first flow processing. Thus, the cooled ink in the circulation flow path 69 can be replaced with the ink warmed by the heater 73.

Figure 8:
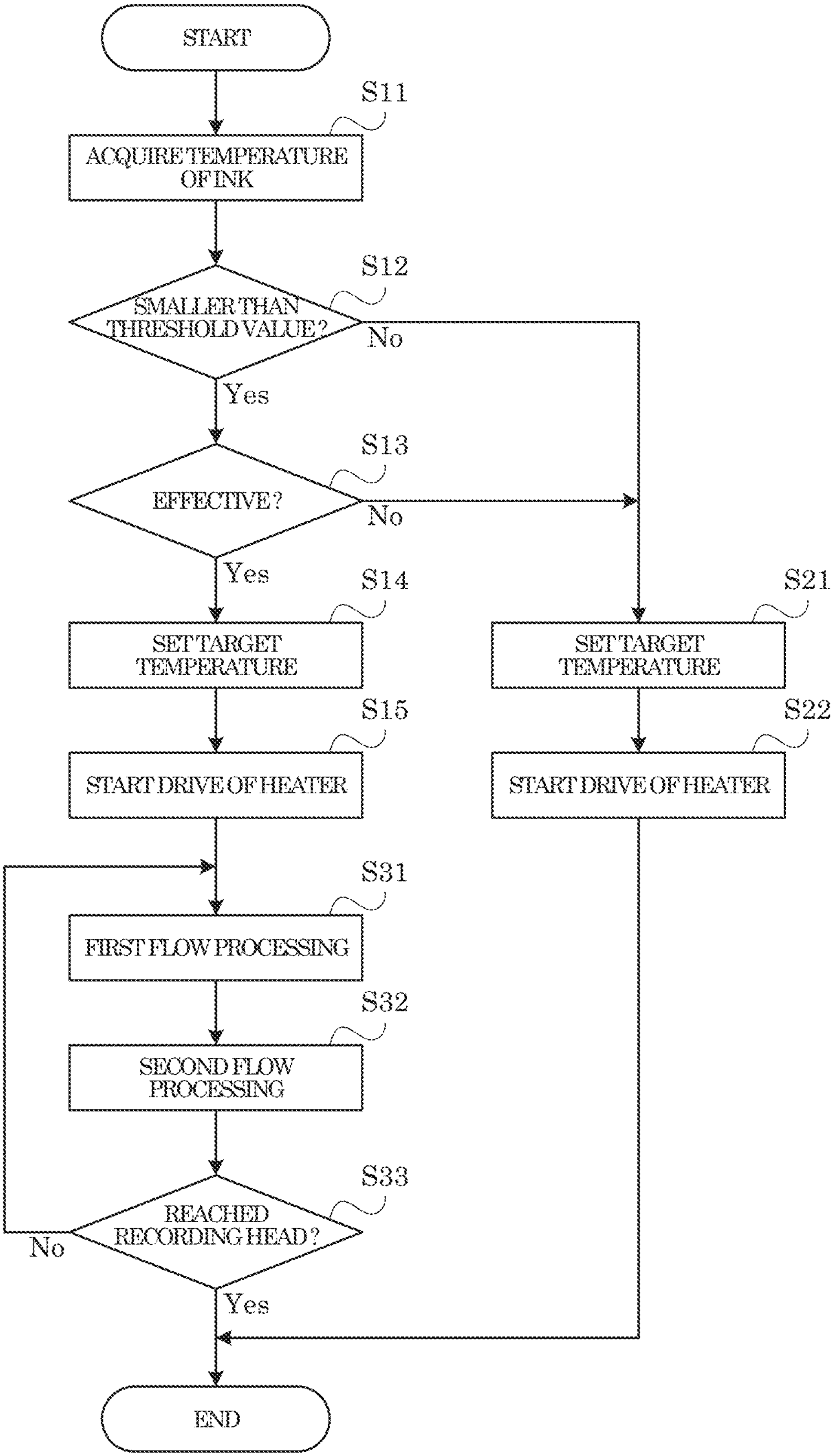
FIG. 8 is a flowchart showing an example of operation control processing executed in the image forming apparatus according to the another embodiment of the present disclosure.

Furthermore, the operation control processing may include processing of Step S31 to Step S33 shown in FIG. 8 in place of Step S16 to Step S18.

<Step S31>

In Step S31, the control portion 7 executes the first flow processing. Specifically, the control portion 7 drives the second pump 67 in a state where the on-off valve is closed. Thus, the ink in the amount of the second value is sucked from the sub ink tank 65, and the sucked ink flows along the supply path and the recovery path. In addition, the control portion 7 drives the first pump 63 after driving the second pump 67. Thus, the ink is sucked from the ink container 61 side, and the ink in the amount of the second value, that includes the ink warmed by the heater 73, is supplied to the sub ink tank 65. Consequently, the temperature of the ink in the sub ink tank 65 is adjusted to the print-optimum temperature.

<Step S32>

In Step S32, the control portion 7 executes the second flow processing. Specifically, the control portion 7 drives the second pump 67 in a state where the on-off valve is opened. Thus, the ink in the sub ink tank 65 whose temperature has been adjusted to the print-optimum temperature by the processing of Step S31 is supplied to the recording head 30 side. Moreover, the cooled ink in the circulation flow path 69 is supplied to the sub ink tank 65.

<Step S33>

In Step S33, the control portion 7 determines whether or not the warmed ink has reached the recording head 30. Herein, the processing of Step S31, Step S32, and Step S33 is executed by the flow processing portion 93 of the control portion 7.

Specifically, the control portion 7 determines that the warmed ink has reached the recording head 30 when the number of times the processing of Step S31 and Step S32 is executed reaches the specific number of times.

Herein, when determining that the warmed ink has reached the recording head 30 (Yes in S33), the control portion 7 ends the operation control processing. On the other hand, when the warmed ink has not reached the recording head 30 (No in S33), the control portion 7 shifts the processing to Step S31.

By executing the processing of Step S31 to Step S33 described above, the cooled ink in the circulation flow path 69 can be replaced with the ink warmed by the heater 73. Consequently, variation in temperature of the ink in the circulation path can be reduced.

Moreover, the image forming apparatus 100 does not need to include the sub ink tank 65. In other words, the recording head 30 may directly receive supply of the ink from the ink container 61. In this case, the control portion 7 does not need to include the setting processing portion 94.

[Notes of Disclosure]

Hereinafter, a general outline of the disclosure extracted from the embodiments described above will be noted. It is noted that the respective configurations and processing functions described in the notes below can be sorted and arbitrarily combined as appropriate.

Note 1

An image forming apparatus, including: an ejection portion which ejects ink; a first ink flow path which forms a supply path of the ink that reaches the ejection portion; a second ink flow path which forms a recovery path of waste ink ejected by the ejection portion; a heater which warms the ink at a warming position that is more on an upstream side of a flowing direction of the ink than the ejection portion on the supply path; an acquisition processing portion which acquires a temperature of the ink in a specific section from the warming position to the ejection portion on the supply path; and a flow processing portion which causes, when the temperature of the ink acquired by the acquisition processing portion is smaller than a predetermined threshold value, the ink warmed by the heater to flow along the supply path and the recovery path until the ink reaches the ejection portion.

Note 2

The image forming apparatus according to note 1, in which the acquisition processing portion acquires, when the image forming apparatus shifts from a first state where image formation is impossible to a second state where the image formation is possible, the temperature of the ink in the specific section based on an elapsed time since a previous shift to the first state and a temperature at an installation position of the image forming apparatus.

Note 3

The image forming apparatus according to note 1 or 2, including a switch processing portion which switches an ink flowing function by the flow processing portion between effective and ineffective according to a user operation, in which when the temperature of the ink acquired by the acquisition processing portion is smaller than the threshold value, the flow processing portion causes the ink to flow in a case where the ink flowing function is effective and does not cause the ink to flow in a case where the ink flowing function is ineffective.

Note 4

The image forming apparatus according to any one of notes 1 to 3, including: an accumulation portion which is provided in the specific section and accumulates the ink; and a third ink flow path which forms a circulation path of the ink that passes through the ejection portion and the accumulation portion together with the first ink flow path, in which the flow processing portion executes, after the ink warmed by the heater reaches the accumulation portion by execution of first flow processing for causing the ink to flow along the supply path and the recovery path, second flow processing for causing the ink to flow along the circulation path.

Note 5

An operation control method executed in an image forming apparatus including an ejection portion which ejects ink, a first ink flow path which forms a supply path of the ink that reaches the ejection portion, a second ink flow path which forms a recovery path of waste ink ejected by the ejection portion, and a heater which warms the ink at a warming position that is more on an upstream side of a flowing direction of the ink than the ejection portion on the supply path, the operation control method including: an acquisition step of acquiring a temperature of the ink in a specific section from the warming position to the ejection portion on the supply path; and a flow step of causing, when the temperature of the ink acquired in the acquisition step is smaller than a predetermined threshold value, the ink warmed by the heater to flow along the supply path and the recovery path until the ink reaches the ejection portion.

It is to be understood that the embodiments herein are illustrative and not restrictive, since the scope of the disclosure is defined by the appended claims rather than by the description preceding them, and all changes that fall within metes and bounds of the claims, or equivalence of such metes and bounds thereof are therefore intended to be embraced by the claims.

The invention claimed is:

1. An image forming apparatus, comprising:

an ejection portion which ejects ink from a nozzle;

a first ink flow path which forms a supply path of the ink that reaches the ejection portion;

a second ink flow path which forms a recovery path of waste ink ejected from the nozzle by the ejection portion;

a heater which warms the ink at a warming position that is more on an upstream side of a flowing direction of the ink than the ejection portion on the supply path;

an acquisition processing portion which acquires a temperature of the ink in a specific section from the warming position to the ejection portion on the supply path; and a flow processing portion which causes, when the temperature of the ink acquired by the acquisition processing portion is smaller than a predetermined threshold value, the ink warmed by the heater to flow along the supply path and the recovery path until the ink reaches the ejection portion.

2. The image forming apparatus according to claim 1, wherein the acquisition processing portion acquires, when the image forming apparatus shifts from a first state where image formation is impossible to a second state where the image formation is possible, the temperature of the ink in the specific section based on an elapsed time since a previous shift to the first state and a temperature at an installation position of the image forming apparatus.

3. The image forming apparatus according to claim 1, comprising a switch processing portion which switches an ink flowing function by the flow processing portion between effective and ineffective according to a user operation, wherein when the temperature of the ink acquired by the acquisition processing portion is smaller than the threshold value, the flow processing portion causes the ink to flow in a case where the ink flowing function is effective and does not cause the ink to flow in a case where the ink flowing function is ineffective.

4. The image forming apparatus according to claim 1, comprising:

an accumulation portion which is provided in the specific section and accumulates the ink; and a third ink flow path which forms a circulation path of the ink that passes through the ejection portion and the accumulation portion together with the first ink flow path, wherein the flow processing portion executes, after the ink warmed by the heater reaches the accumulation portion by execution of first flow processing for causing the ink to flow along the supply path and the recovery path, second flow processing for causing the ink to flow along the circulation path.

* * * * *